(12) United States Patent
Kim et al.

(10) Patent No.: US 11,199,813 B2
(45) Date of Patent: Dec. 14, 2021

(54) HOLOGRAM REPLICATING METHOD AND HOLOGRAM REPLICATING DEVICE

(71) Applicant: LG Chem, Ltd., Seoul (KR)

(72) Inventors: Jae Jin Kim, Daejeon (KR); Dae Han Seo, Daejeon (KR); Min Soo Song, Daejeon (KR); Sang Choll Han, Daejeon (KR)

(73) Assignee: LG Chem, Ltd.

( * ) Notice: Subject to any disclaimer, the term of this patent is extended or adjusted under 35 U.S.C. 154(b) by 231 days.

(21) Appl. No.: 16/349,471

(22) PCT Filed: Nov. 28, 2017

(86) PCT No.: PCT/KR2017/013660
§ 371 (c)(1),
(2) Date: May 13, 2019

(87) PCT Pub. No.: WO2018/101698
PCT Pub. Date: Jun. 7, 2018

(65) Prior Publication Data
US 2019/0339646 A1 Nov. 7, 2019

(30) Foreign Application Priority Data

Nov. 30, 2016 (KR) .................. 10-2016-0162150

(51) Int. Cl.
*G03H 1/20* (2006.01)
*G03H 1/04* (2006.01)

(52) U.S. Cl.
CPC .............. *G03H 1/20* (2013.01); *G03H 1/041* (2013.01); *G03H 1/0402* (2013.01); *G03H 1/0465* (2013.01); *G03H 2001/043* (2013.01); *G03H 2001/0413* (2013.01); *G03H 2223/23* (2013.01); *G03H 2227/04* (2013.01)

(58) Field of Classification Search
None
See application file for complete search history.

(56) References Cited

U.S. PATENT DOCUMENTS 3,790,245 A * 2/1974 Hannan .................. G03H 1/028
359/3
4,946,258 A 8/1990 Fisher et al.
(Continued)

FOREIGN PATENT DOCUMENTS

EP 0745237 B1 7/2003
JP H04153686 A 5/1992
(Continued)

OTHER PUBLICATIONS

Chinese Search Report for Application No. 201780072278.1, dated Sep. 1, 2020, pp. 1-2.
(Continued)

*Primary Examiner* — Jennifer D. Carruth
(74) *Attorney, Agent, or Firm* — Lerner, David, Littenberg, Krumholz & Mentlik, LLP

(57) ABSTRACT

The present application provides a replicating method and a replicating device of a transmission type holographic optical element capable of mass-replicating the transmission type holographic optical element by a continuous and economical process.

13 Claims, 3 Drawing Sheets

(56) References Cited

U.S. PATENT DOCUMENTS

| | | | | |
|---|---|---|---|---|
| 4,973,113 | A | * | 11/1990 | Harrington ............ G03H 1/202 |
| | | | | 359/17 |
| 5,066,133 | A | * | 11/1991 | Brienza .............. G02B 6/02133 |
| | | | | 359/570 |
| 5,576,853 | A | | 11/1996 | Molteni et al. |
| 5,948,199 | A | * | 9/1999 | McGrew .................. B44B 5/00 |
| | | | | 156/231 |
| 6,055,075 | A | * | 4/2000 | Nishikawa ........... G02B 5/1876 |
| | | | | 359/12 |
| 8,599,458 | B2 | * | 12/2013 | Dausmann ............. G03H 1/202 |
| | | | | 359/12 |
| 2011/0134496 | A1 | | 6/2011 | Tompkin et al. |
| 2011/0188102 | A1 | * | 8/2011 | Shirakura ........ G06K 19/07749 |
| | | | | 359/2 |
| 2011/0214804 | A1 | | 9/2011 | Dausmann |
| 2012/0212789 | A1 | * | 8/2012 | Shirakura ............. G09F 3/0291 |
| | | | | 359/2 |
| 2015/0158323 | A1 | | 6/2015 | Richert et al. |
| 2018/0188690 | A1 | * | 7/2018 | Kobrin ................ G03H 1/0476 |

FOREIGN PATENT DOCUMENTS

| | | |
|---|---|---|
| JP | H6118861 A | 4/1994 |
| JP | 2982011 B2 | 11/1999 |
| JP | 2001125475 A | 5/2001 |
| JP | 2006011489 A | 1/2006 |
| JP | 3803376 B2 | 8/2006 |
| JP | 2007286646 A | 11/2007 |
| JP | 4374679 B2 | 12/2009 |
| JP | 2010117581 A | 5/2010 |
| JP | 2010131878 A | 6/2010 |
| JP | 2011521274 A | 7/2011 |
| JP | 2011227182 A | 11/2011 |
| KR | 20130088995 A | 8/2013 |
| KR | 20150027205 A | 3/2015 |
| WO | 2016012813 A2 | 1/2016 |

OTHER PUBLICATIONS

Extended European Search Report including the Written Opinion for Application No. EP 17876557.4 dated Jul. 24, 2019, pp. 1-7.
International Search Report for PCT/KR2017/013660, dated Apr. 16, 2018.

* cited by examiner

[Figure 1]
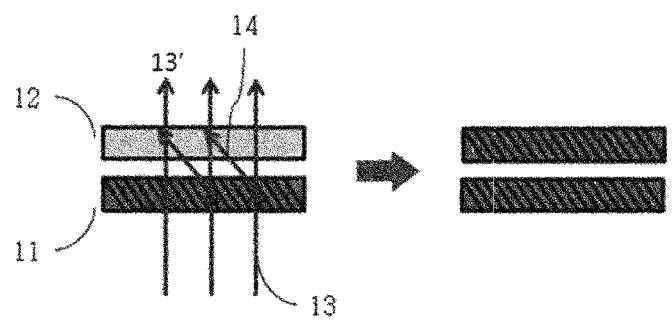
[Figure 2a]
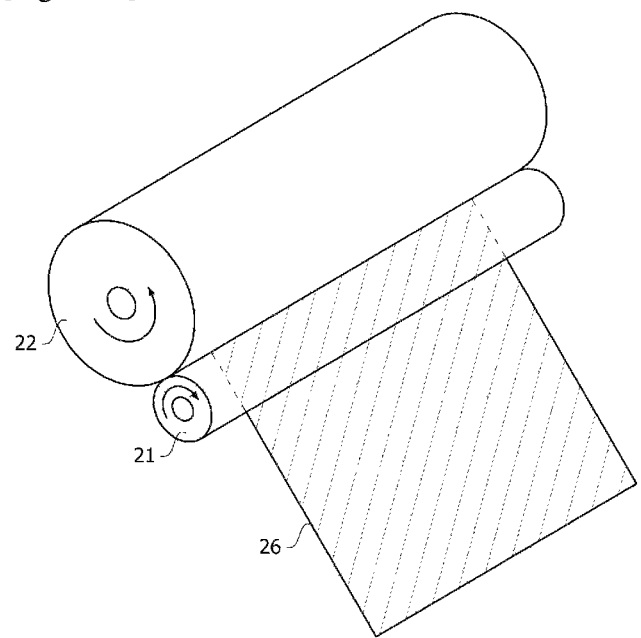

[Figure 2b]
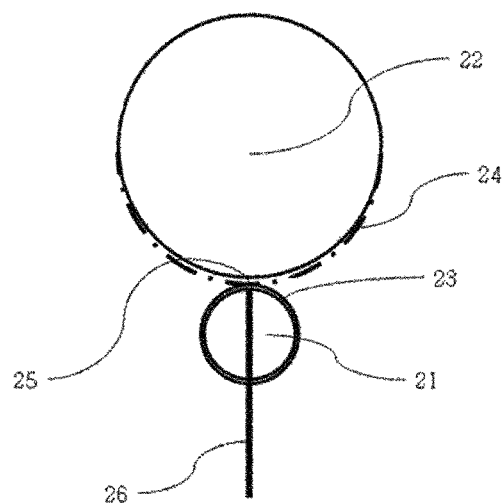
[Figure 3]
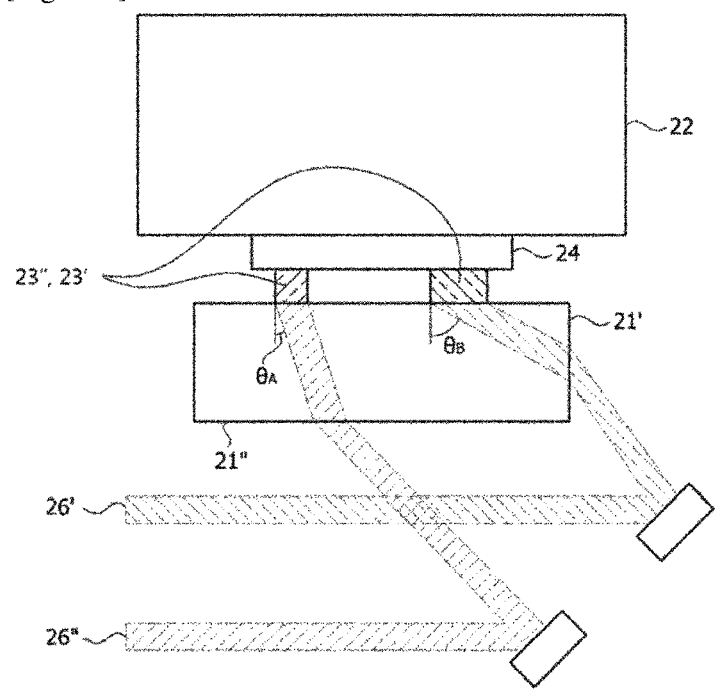

[Figure 4]
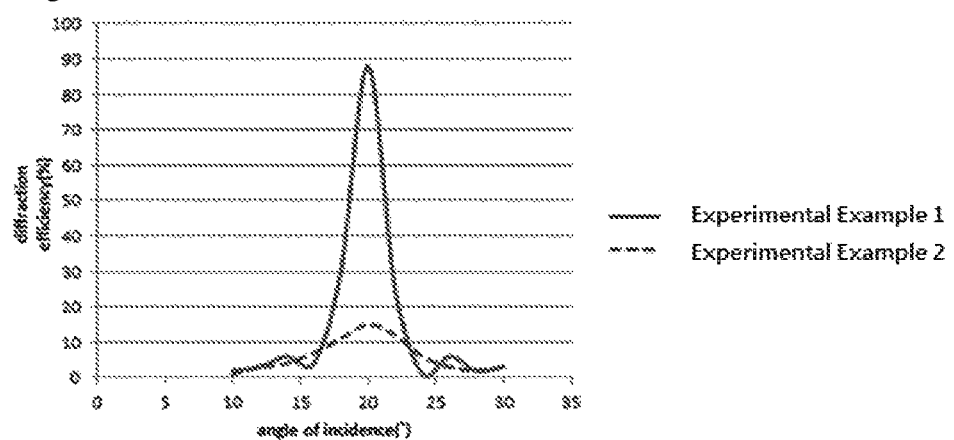

HOLOGRAM REPLICATING METHOD AND HOLOGRAM REPLICATING DEVICE

CROSS-REFERENCE TO RELATED APPLICATIONS

This application is a national phase entry under 35 U.S.C. § 371 of International Application No. PCT/KR2017/013660, filed on Nov. 28, 2017, which claims priority from Korean Patent Application No. 10-2016-0162150, filed on Nov. 30, 2016, the disclosures of which are hereby incorporated herein by reference in their entireties.

TECHNICAL FIELD

Technical Field

The present application relates to a method for replicating a hologram optical element and a device used in the replicating method.

Background Art

A holographic optical element refers to an optical element in which an object wave, which is light reflected or diffracted from an object, is interfered with a reference wave, which is the other wave having coherency with the light, to record an interference pattern on a photosensitive material. Since the photosensitive material on which the interference pattern is recorded reproduces image information by using diffraction instead of reflection or refraction, such a photosensitive material is also classified as one kind of diffraction optical elements (DOEs).

The holographic optical element may also be manufactured by irradiating the respective photosensitive materials with the object wave and the reference wave, as described above, but usually, it is manufactured by a method of manufacturing a master and replicating it. For example, as in FIG. 1, a method of replicating the holographic optical element while irradiating the master (11) with light (13) having a predetermined characteristic and irradiating the photosensitive material (12) with the light (13') penetrating the master (11) without diffraction and the light (14) diffracted with penetrating the master (11) may be used. However, such a method is not suitable for mass production because it replicates one by one.

DISCLOSURE

Technical Problem

It is an object of the present application to provide a method for replicating a transmission type holographic optical element and a device used therefor.

It is another object of the present application to provide a method for replicating a transmission type holographic optical element having excellent replication productivity and a device used therefor.

The above objects and other objects of the present application can be all achieved by the present application which is described in detail below.

Technical Solution

Hereinafter, a method and a device according to one example of the present application will be described in detail with reference to the accompanying drawings. For convenience of explanation, the size or shape of each configuration shown may be exaggerated or reduced. Also, the optical paths shown in the accompanying drawings are exemplary and do not limit the scope of protection of the present application.

In one example related to the present application, the present application relates to a method for replicating a holographic optical element (HOE), which is a type of diffractive optical element.

In the present application, the holographic optical element to be replicated can be referred to as a master. The master is an element (11) having a predetermined diffraction or interference pattern, that is, a hologram record, such that a part of the incident light may be transmitted as such and the remaining part of the incident light may be diffracted at a particular angle, for example, as in FIG. 1. That is, when a predetermined laser is incident on the master, the laser penetrating the master as such and the diffracted laser can be generated. At this time, the light transmitted without diffraction and the diffracted light can be referred to as a transmitted beam and a diffracted beam, respectively.

If the above function can be performed, the type of the master, that is, the diffractive optical element to be replicated is not particularly limited. For example, the diffractive optical element may be a transmission type holographic optical element, and more specifically, a volume holographic grating (VHG).

In the case of transmissive hologram replication, after first irradiating the master rather than the photosensitive material with the laser, the transmitted beam and the diffracted beam have to be irradiated on the same side of the photosensitive sheet. Therefore, in order to be applied to a mass production process such as roll-to-roll, it is necessary to control positional relationship of a plurality of rolls, the master and the photosensitive sheet in the process, and optical paths. Considering these points, the inventors of the present application have come to invent the replication method and device of the present application to be described below.

According to one example of the present application, a holographic optical element may be replicated by a roll-to-roll method, which is a continuous process, using a master roll in which a master is formed on its surface, a main roll in which a photosensitive material is attached to its surface separately from the master roll and a laser line beam irradiated toward the master roll. As described below, in the case of the present application, two rolls, that is, a master roll and a main roll in which an article to be replicated and a replicated article are formed on their surfaces, respectively, are used and a linear laser line beam is used for replication, considering that the contact region (exposure region) between two rolls is linear.

In an example related to the present application, the respective members used to carry out the method of the present application may have the following constitutions or characteristics.

In one example, the master roll is a roll configuration used in a roll-to-roll process in a state where is in contact with or spaced from a main roll, which may be a configuration disposed so that a laser line beam necessary for hologram replication may be irradiated on the photosensitive material attached to the main roll through a master formed on the surface thereof. In one example, the master roll may be a cylinder roll having a cylindrical shape that can rotate about any internal axis.

The master roll may have laser light transmissivity. In the present application, the term laser transmissivity may mean, for example, a case where transmittance for a laser having a wavelength in a range of 380 nm to 800 nm is about 55% or more, about 65% or more, about 75% or more, about 85% or more, or about 95% or more, and the upper limit thereof is about 100%, which is less than 100%. If the transmittance is satisfied, the material for forming the master roll is not particularly limited. In one example, the master roll may comprise BK7, quartz, transparent glass, or a transparent plastic material.

The master having light-transmissivity roll provides an optical path for replicating the transmission type hologram element. Specifically, the laser line beam irradiated to any region or surface of the master roll may pass through the inside of the light-transmission master roll, may penetrate the master of the master roll surface, may be separated into two lasers capable of interfering with each other, and then may be irradiated onto the photosensitive material, whereby a transmission type hologram element may be replicated.

A master having a diffraction or interference pattern may be formed on the surface of the master roll over some of the circumference or the entire circumference. In this regard, the fact that a master is formed over the entire circumference may mean, for example, like a circle, a case where both ends of the master having a predetermined length meet on the surface (circumferential surface of cylinder) of the master roll to form a closed curve. On the other hand, the fact that the master is formed over some of the circumference of the master roll may mean that the master having a predetermined length does not form a closed curve on the surface of the master roll, but exists only in a part. A plurality of masters may be present on the master roll surface. The size of the master or the shape or type of the pattern possessed by the master can be appropriately adjusted according to the size or shape, and the like of the pattern desired to be replicated in the photosensitive material, which is not particularly limited.

In one example, the refractive index of the master may have a value of more than 1 to 2 or less, but is not particularly limited.

In one example, the main roll may be a cylinder having a cylindrical shape, which may be a configuration transporting the photosensitive material attached to the surface (circumferential surface of cylinder) while being rotated about any axis inside so that the photosensitive material may be exposed to the line beam. For convenience of process, the photosensitive material may be in a film or sheet shape. At this time, the main roll may have a smooth surface for adhesion with the photosensitive material.

The main roll may have a color of black series with low reflection to prevent the laser beam passing through the photosensitive material from being reflected on the main roll and exposed again to the photosensitive material. That is, the main roll may have light absorbency. For example, the main roll may be a configuration having a reflectance for the irradiated light of 10% or less. The lower limit of the reflectance may be about 0%. If the color of black series can be realized, the type of the material forming the main roll, more specifically, the material forming the surface of the main roll in contact with the photosensitive material is not particularly limited. In one example, the main roll may comprise a Teflon material.

The photosensitive material attached to the main roll is a material on which optical information can be recorded while being exposed to two beams penetrating the master, as described above. In the hologram related field, various kinds of photosensitive materials which can be used for replicating a transmission type holographic optical element are known, and these materials can also be used without limitation in the present application. For example, as the photosensitive material, a photopolymer, a photoresist, a silver halide emulsion, a dichromated gelatin, a photographic emulsion, a photothermoplastic or a photorefractive material, and the like may be used. In one example, a photopolymer may be used as the photosensitive material. More specifically, the photosensitive material may be a film consisting of only a photopolymer, or may also have a layered structure comprising a photosensitive layer (photopolymer layer) composed of a photopolymer and a substrate for the layer together. Such a photosensitive material has a film shape, which can be provided in the replicating method of the present application in a state attached to the main roll surface. In this case, the substrate used together with the photopolymer may be an optically transparent film without anisotropy, and for example, may be a substrate comprising triacetyl cellulose (TAC), polyethylene (PE), polycarbonate (PC), polypropylene (PP), polyamide (PA) or polyethylene terephthalate (PET), and the like, but is not particularly limited. In some cases, in order to protect the photopolymer of the photosensitive layer, a protective film may be further laminated. In one example, the photosensitive layer used in the photosensitive material may have a thickness in a range of 3 to 30 µm, and the substrate may have a thickness in a range of 20 to 200 µm, without being particularly limited.

In one example, the refractive index of the photosensitive material may have a value of more than 1 to 2 or less, but is not particularly limited.

Upon manufacturing the transmission type hologram element, since light must be first irradiated on the master, a method of attaching the master and the photosensitive material to one light-transmission (transparent) cylinder surface in order and irradiating it with light on the opposite side of the attachment surface of the master and the photosensitive material has been also considered in the prior art. When the curvature of the cylinder is large, it is difficult to adjust the angle of light transferred from the master to the photosensitive material. Therefore, in order to reduce the curvature of the transparent cylinder, a transparent cylinder having a high manufacturing cost had to be made large. However, in the present application, since one roll is further used in addition to the master roll having light-transmissivity, it is possible to economically solve the problem caused by the curvature of the photosensitive material by increasing the size of the main roll to be used together without the need to make the light-transmissive master roll large. Although not particularly limited, in the present application, the size (circle diameter) of the master roll may be formed smaller than the size (circle diameter) of the main roll.

The laser line beam is used to expose the photosensitive material, thereby replicating the master. In the present application, the line beam may mean a laser which is irradiated, when the region to be irradiated is linear upon irradiating any plane with a laser, that is, in a linear form on an incident plane. In this regard, in the present application, the length of a linear irradiation region when the laser line beam has been irradiated on a plane, that is, the linear length of the laser line beam, may be referred to as a line width. In one example, as in FIG. 2a, the laser line beam may be irradiated such that its line width is parallel to the rotational axis of the rotating main roll or master roll. Specifically, an exposure region irradiated with the laser line beam having a predetermined line width may be a contact region between the master roll and the main roll, or between the master and the photosensitive material.

Generally, high-priced laser equipment is required for the hologram recording process, and mass production is difficult because it must be controlled so that even minute external vibrations do not occur during exposure. Moreover, when the light is enlarged and irradiated on the entire area of the photosensitive material intended to record the hologram, a large-area optical element corresponding to the irradiation area may be required and a high output laser device may be further required, so that there is a problem that the cost increases. Furthermore, even if light can be irradiated on the entire area of the photosensitive material, there is a problem that the intensity of the light is reduced due to the limited laser power in reality and the exposure time is increased to increase possibility of noise generation and simultaneously productivity is lowered. That is, the method using a normal laser is not suitable for a roll-to-roll process performed while moving the photosensitive material. However, according to the present application in which the master and the photosensitive material are attached to the master roll and main roll surfaces, respectively, and the line beam is irradiated as it is scanned through the rotating master roll and main roll, while solving the above problems, mass replication by the roll-to-roll continuous process is possible. In addition, it is preferable that the light used for replication is irradiated to the master under the same or uniform condition for the time when the hologram is replicated, but it is difficult to provide the entire area of the master with uniform light as a general laser. Particularly, in the roll-to-roll process in which the film is greatly moved during the laser exposure, replication of the hologram is not easy. However, in the case of using the line beam in the roll-to-roll process, while the condition of the beam incident on the master is uniformly maintained, the hologram replication can be performed in a continuous process during movement of the photosensitive material.

In one example, the line beam may have a line width of 2.5 mm or less. For example, the lower limit of the line width may be 200 μm or more, 400 μm or more, 600 μm or more, or 800 μm or more, and the upper limit may be 2.0 mm or less, 1.8 mm or less, 1.5 mm or less, or 1.0 mm or less. By adjusting the line width of the laser line beam to the above range, it is possible to prevent the average out occurring in the process of transporting the photosensitive material or the resulting recording degradation of the hologram.

The incident angle at which the line beam is incident on the master can be determined in consideration of the object wave and the reference wave used to record the hologram on the master. For example, when a transmission type holographic diffractive optical element is used as a master, a line beam can be incident on the master at the same angle (direction) as any one of the object wave or the reference wave used to record the hologram on the master. Those having ordinary knowledge in the relevant art will appreciate that in adjusting the incident angle of the line beam with respect to the master, the incident angle should be appropriately controlled in consideration of the refractive index or the like of the master roll.

The wavelength of the laser is not particularly limited, which may be selected in consideration of the use of the holographic optical element to be replicated. For example, the laser line beam may use a single laser of any wavelength, or a laser of two or more different wavelengths. Particularly, in order to realize a full color hologram, it is possible to use lasers of three wavelengths corresponding to red (R), green (G) and blue (B) regions in a combination thereof. In the field of manufacturing a holographic optical element, the matters relating to selection of the wavelength of the laser as above are known.

In one example, the laser may be a continuous wave (CW) laser. Since the continuous wave laser has a stable power as compared with a pulse laser, it is possible to record an interference pattern having uniform optical characteristics in the exposure region of the photosensitive material.

In another example, the laser may be a single longitudinal mode laser. If a multi-mode laser is used, the coherency of the light passing through the master and the diffracted light may be lowered.

The replicating method of the present application performed using the master roll, the main roll and the line beam, having the above configuration, may be performed, as in FIG. 2b, by rotating a laser-transmissive master roll in which a master having a pattern (a hologram is recorded) is formed on its surface and being irradiated with a laser line beam toward the master roll while transporting a photosensitive material in a state attached to the main roll surface. At this time, the laser line beam can penetrate the master of the master roll surface via the inside of the light-transmissive master roll and then irradiated to the photosensitive material.

The replicating method of the present application is performed such that the irradiated laser line beam can sequentially penetrate any circumferential surface of the master roll, the inside of the master roll, the master and the photosensitive material. To this end, the master present in the surface of the master roll and the photosensitive material attached to the main roll may have to face each other, and thus in the method of the present application, the master roll and the main roll can be disposed and driven (rotated) so that the laser line beam can have the above path. For example, a separation distance between the master roll and the main roll can be adjusted in consideration of the size of the master and the photosensitive material, or the like, and a rotational speed of each roll can be adjusted in consideration of other various conditions. Accordingly, the diffraction pattern of the master can be replicated to the photosensitive material by interference of the diffracted beam and the transmitted beam generated while the laser line beam penetrates the master.

Specifically, when the master and the photosensitive material rotated or transported in different rolls may face each other and the line beam may have such a path, the hologram recorded on the master may be replicated onto the photosensitive material in some regions of the master and the photosensitive material in the same manner as shown in FIG. 1. As described above, the light irradiated to the master may be any one light of the object wave or the reference wave that has been used to record the hologram already recorded in the master, and while the irradiated light penetrates the master, the same hologram may be recorded in the photosensitive material. For example, when the hologram recording is replicated in the photosensitive material using the master (11), which is a transmission type holographic optical element, as shown in FIG. 1, a laser having the same wavelength and incident angle as the reference wave used to record the hologram in the master (11) can be irradiated to a diffractive optical element. In this case, the master (11) diffracts a part of the irradiated laser to generate a diffracted laser (14, diffracted beam). In this case, the diffracted laser (14) may have the same wavelength and incident angle as the object wave used to record the holographic optical element (11). Also, the part (13') of the irradiated laser (13) penetrates the transmission type holographic optical element as such. In this way, the hologram can be recorded to the photosensitive material (12), that is, the master can be replicated. The replicated photosensitive material is a diffractive optical element like the master, which can function as a kind of beam splitter capable of emitting an object wave and a reference wave from one light.

According to one example of the present application, the method can be performed such that the replication is made in a state where the master and the photosensitive material are in physical contact with each other. When the replication is made in the state in which the master and the photosensitive material are in contact with each other, it is possible to prevent unwanted reflection from occurring at the interface between the master or the photosensitive material and air and thus lowering the diffraction efficiency of the replicated product.

The method of the present application may further comprise a step of attaching the photosensitive material to the main roll using a lamination roll. For example, the step may be performed by disposing the lamination roll to be spaced apart from the main roll at a predetermined distance and pressing the photosensitive material supplied onto the main roll through another path toward the main roll by the lamination roll. In this case, one side of the photosensitive material in contact with the main roll may have tackiness through a pressure-sensitive adhesive or the like.

In one example, the lamination roll may be heated so that the photosensitive material may be easily attached to the main roll. If the temperature is such that the photosensitive material can be easily peeled off from the main roll after exposure without deformation of the photosensitive material, the temperature range for heating the lamination roll is not particularly limited, which may be suitably adjusted according to the type of photosensitive material. For example, it may be 35° C. to 100° C.

In one example, the method of the present application can be irradiated with a laser line beam while tilting the laser line beam in the rotational direction of the main roll, that is, the traveling direction (MD: machine direction) or the vertical direction (TD: transverse direction) thereof, thereby adjusting the incident angle of the laser line beam irradiated to the master. The incident angle may be, for example, an angle measured based on the normal of the master incidence plane. When the incident angle is adjusted as above, it is possible to replicate various transmission type hologram elements performing different optical functions. As a means (not shown) for tilting the laser line beam, for example, an angle-adjustable reflecting mirror or the like can be used.

In one example, the method of the present application may be performed using two or more line beams or two or more masters. For example, as in FIG. 3, two holograms can be simultaneously recorded in one process by attaching two masters (23', 23") to the master roll surface in the direction of the rotational axis of the master roll and irradiating the respective masters with two laser line beams (26', 26"). In this case, the angles at which the respective line beams are irradiated to the master may be the same or different and the photosensitive material may be present on the main roll in one or two or more numbers so that predetermined exposure regions may be secured at positions where two or more masters are present. The angle at which each line beam is irradiated may be adjusted by a tilting means such as a reflecting mirror. It is apparent to those skilled in the art that the refractive index of the master roll can be considered together when adjusting the angle. Two or more holograms having different optical characteristics may be replicated depending on the master used and the angle of the laser line beam irradiated on the master.

In another example, the line beam may be irradiated toward the circular part of the cylindrical master roll. In this case, the incident angle of the laser line beam with respect to the normal of the master incidence plane may be very greatly adjusted. For example, as in FIG. 3, an angle ($\theta_A$) where a first laser line beam (26") incident through the circumferential surface (21") of the cylindrical master roll is refracted at the master roll interface and then enters the master (23") is not large, while a second laser line beam (26') which is incident through the side of the circular part (21') of the cylindrical master roll and has to proceed to the master (23') attached to the circumferential surface of the master can be incident at a relatively large angle ($\theta_B$). That is, when the refractive index of the cylinder is in a range of more than 1 to 1.5 or less, the laser line beam incident through the circumferential surface of the master roll cannot have a large incident angle such as a case where the incident angle ($\theta_A$) is 42° C. or more, but the laser line beam incident through the circular part can have a large incident angle such as a case where the angle ($\theta_B$) is 42° C. or more. In other words, when irradiating the circular part of the master roll with the laser line beam, it can be used to produce a predetermined product to which the line beam should be irradiated at an angle of a large incident angle to the master. For example, when it is intended to replicate an element having a refractive index of 1.5 or so that can diffract light incident from the outside at an angle of 0° with respect to the incidence plane normal, that is, light incident perpendicularly to the incidence plane, into light that is always totally reflected at the interface with the adjacent air layer or low refractive material, it must be incident on the master at an incident angle of a large angle which can be totally reflected, where the above-described method can be used for this element replication.

In another example related to the present application, the present application relates to a replicating device for performing the replicating method. As shown in FIG. 2, the replicating device of the present application may comprise a master roll (21), a main roll (22), and an optical part (not shown) capable of radiating a laser line beam (26). The configuration and characteristics of the master roll, the main roll and the line beam used in the replicating device are the same as those described above.

As described above, a photosensitive material (24) may be attached to the surface of the main roll (22). And, as described above, a master (23) may be formed on the surface of the laser-transmissive master roll (21). The rotating main roll can transport a photosensitive material such that the photosensitive material can face a master and the laser penetrating the master can be irradiated to the photosensitive material. In one example, as described above, the laser penetrating the master can be irradiated to the photosensitive material in a state where the photosensitive material and the master are in contact with each other.

If the above-described method can be performed, the size of the master roll and the main roll, that is, the diameter of the circle of each roll is not particularly limited. For example, the upper limit of the light-transmissive master roll diameter may be 20 cm or less. In particular, as described above, two rolls are used in the present application, where the size of the light-transmissive roll with a high production price can be relatively reduced, since the curvature problem with roll use can be solved by increasing the size of the main roll relatively large. Specifically, the master roll may have a diameter of 15 cm or less, 10 cm or less, 9 cm or less, 8 cm or less, 7 cm or less, 6 cm or less, or 5 cm or less. In the case of the lower limit, it is not particularly limited, which may be, for example, 1 cm or more, or 2 cm or more in consideration of the size of the master or the like. In the case of the main roll, it may be made larger than the master roll having the above diameter to have a curvature smaller than that of the master roll. For example, the main roll may have a diameter of 10 cm or more, 20 cm or more, or 30 cm or more.

In the present application, the driving speed of the rolls is not particularly limited, which may be adjusted in consideration of the replication productivity of the optical element or the possibility of noise generation in the replication process and the like. In one example, the driving (rotating) speed of the rolls can be adjusted so that the photosensitive material attached to the main roll surface is transported in a speed range of 0.1 m/min to 5 m/min. When adjusting the speed, the diameter of each roll may also be considered.

The optical part is a configuration for providing the above-described laser line beam. For example, the optical part may be a configuration for providing a circular beam as a beam in a line form, using a predetermined device (optics), such as, for example, a line beam generating lens (array). The lens array may comprise a so-called laser line generator lens, such as PL0130, PL0145, PL0160 or PL0175 from THORLABS. The line beam formed while passing through the laser array can be irradiated with almost the same degree of uniform intensity in the region where the line beam is irradiated. In one example, the optical part may be provided so that a line width (length) of the line beam may be adjusted within a predetermined range according to the size of the HOE to be replicated.

In one example, the optical part may be equipped with a tilting means capable of adjusting the incident angle of the laser line beam irradiated to the master. As the tilting means, for example, a reflecting mirror can be used.

In one example, the optical part can radiate a plurality of laser line beams. Specifically, the optical part may comprise a plurality of lower optical parts, for example, a first optical part, a second optical part or a third optical part, and the like. The optical part may provide two or more laser line beams having the same or different incident angles to a plurality of masters, respectively. This configuration makes it possible to simultaneously replicate two or more holograms in one process, as described above.

In one example, the device of the present application may further comprise a lamination roll for attaching the photosensitive material to the main roll. The method of using the lamination roll in combination with the device of the present application is the same as described above, which can be suitably performed by those skilled in the art.

Advantageous Effects

According to the present application, it is possible to provide a replication method and device of a transmission type holographic optical element capable of mass-producing a holographic film having excellent wavelength selectivity.

BRIEF DESCRIPTION OF DRAWINGS

FIG. 1 schematically shows a replication process of a transmissive hologram.

FIGS. 2a and 2b schematically show a replicating method of a transmissive hologram according to one example of the present application and a device used therefor.

FIG. 3 schematically shows an irradiation method of a laser line beam according to one example of the present application.

FIG. 4 compares and shows differences in diffraction efficiency observed when line widths of line beams are different, in relation to Examples of the present application.

Each reference numeral used in the drawings is as follows.
11: master
12: photosensitive material
13: laser irradiated to master
13': laser passing through master (transmitted beam)
14: diffracted laser (diffracted beam)
21, 21', 21": master roll
22: main roll
23, 23', 23": master
24: photosensitive material
25: exposure region
26, 26', 26": laser line beam

MODE FOR INVENTION

Hereinafter, the present application will be described in detail by way of examples. However, the scope of protection of the present application is not limited by examples described below.

Replication of Holographic Element

Experimental Example 1

As shown in FIG. 2, a transmission type holographic element was manufactured using a master roll (21) with a master (23) formed on its surface as a diffractive optical element having a predetermined optical characteristic and a main roll (22) of black series transporting a photosensitive material (24) in a state of being attached to the surface.

Specifically, after attaching the photosensitive material (24) to the surface of the main roll (22) by a lamination roll (not shown) heated to about 50° C., the photosensitive material was transported so as to be capable of facing the master (23) formed on the master roll (21). At this time, the photosensitive material (24) was transported by the main roll (22) at a speed of about 1.5 m/min. On the other hand, the master (23) was formed on the surface of the master roll (21) having a diameter of 10 cm. In a state where the master and the photosensitive material were in contact with each other while facing each other, a laser line beam (26) was irradiated thereto and the line beam sequentially penetrated the master roll (21) and the master (23), whereby it was subjected so that the line beam could be irradiated to an exposure region (25) in contact with the photosensitive material (24) and the master (23). The irradiated laser line beam is a continuous light laser and a single longitudinal mode, and has a wavelength of 532 nm and a line width of about 1 mm.

Experimental Example 2

The method of the present application was performed in the same manner as in Example except that the line width of the used laser line beam was 3 mm.

Evaluation of Replicated Holographic Optical Element

The diffraction efficiency of the transmissive hologram manufactured in each example was shown in FIG. 4. In FIG. 4, the horizontal axis represents the angle of incidence (degree, °) of the incident light incident on the photosensitive material on which the hologram is recorded, and the vertical axis represents the diffraction efficiency (%) of the diffracted light with respect to the incident light. The diffraction efficiency was calculated by the following equation.

Diffraction efficiency=intensity of diffracted light/ (intensity of diffracted light+intensity of transmitted light) [Equation]

As shown in FIG. 4, in the case of Experimental Example 1 using the line beam having a line width of 1 mm, the diffraction efficiency was larger than that of Experimental Example 2 and it showed a sharper peak.

The invention claimed is:

1. A method for replicating a transmission type holographic optical element, comprising:
   rotating a master roll having laser-transmissivity, a master being formed on a surface of the master roll, the master being a diffractive optical element;
   transporting a photosensitive material attached to a surface of a main roll;
   attaching the photosensitive material to the surface of the main roll using a lamination roll; and
   irradiating the master roll with a laser line beam,
   wherein the laser line beam is irradiated onto the photosensitive material after penetrating the master, the laser line beam passing through an inside of the master roll, and
   wherein the main roll has a reflectance for the irradiated laser line beam of 10% or less.

2. The method according to claim 1, further comprising replicating a diffraction pattern of the master on the photosensitive material by interference of a diffracted beam and a transmitted beam each generated from the laser line beam while the laser line beam penetrates the master, the replicating being performed while the master and the photosensitive material face each other.

3. The method according to claim 2, wherein the replicating is performed while the master and the photosensitive material are in contact with each other.

4. The method according to claim 1, wherein the master is formed on a portion of the surface of the master roll extending around part or all of an outer circumference of the master roll.

5. The method according to claim 1, further comprising adjusting an incident angle of the laser line beam irradiated to the master by changing an optical path of the laser line beam using a tilting means.

6. The method according to claim 5, wherein the master is a first master and the laser line beam is a first laser line beam, a second master is formed on the surface of the master roll, and wherein a second laser line beam is irradiated onto the photosensitive material after penetrating the second master.

7. The method according to claim 1, wherein the laser line beam has a line width of 2.5 mm or less.

8. A device for replicating a transmission type holographic optical element, comprising:
   a main roll configured to rotate about a first internal axis and configured to transport a photosensitive material attached to a surface of the main roll;
   a lamination roll configured to attach the photosensitive material to the surface of the main roll;
   a laser-transmissive master roll configured to rotate about a second internal axis and configured to transport a master formed on a surface of the master roll, the master being a diffractive optical element; and
   an optical part configured to radiate a laser line beam toward the master roll so that the laser line beam is irradiated to the photosensitive material after passing through an inside of the master roll and penetrating the master,
   wherein the main roll has a reflectance for the laser line beam of 10% or less.

9. The device according to claim 8, wherein the main roll and the master roll are disposed and adjacent to one another so that when the main roll and the master roll are rotated about the first internal axis and the second internal axis, respectively, a diffraction pattern of the master is replicated on the photosensitive material by interference of a diffracted beam and a transmitted beam each generated from the laser line beam when the laser line beam penetrates the master.

10. The device according to claim 8, wherein the master and the photosensitive material are in contact with each other when the laser line beam is irradiated to the photosensitive material.

11. The device according to claim 8, further comprising a tilting means configured to adjust an incident angle of the laser line beam relative to the surface of the master roll on which the master is formed.

12. The device according to claim 11, wherein the optical part is a first optical part, the laser line beam is a first laser line beam, and the master is a first master, the device further comprising a second optical part configured to radiate a second laser line beam to a second master formed on the surface of the master roll.

13. The device according to claim 8, wherein the laser line beam has a line width of 2.5 mm or less.

* * * * *